3,378,537
HOMOPOLYMERS OF METHYL VINYL ETHER AND PROCESSES FOR MAKING SAME USING BOROTRIFLUORIDE OR ETHERATES THEREOF, DIOXANE AS CATALYST AND AROMATIC HYDROCARBON AS SOLVENT

Herman S. Schultz, Easton, Pa., assignor to General Aniline & Film Corporation, New York, N.Y., a corporation of Delaware
No Drawing. Filed Nov. 6, 1964, Ser. No. 409,601
2 Claims. (Cl. 260—91.1)

This invention relates to new polymers of methyl vinyl ether and the methods of producing such polymers, and more particularly to such homopolymers which are characterized by outstanding and unusual physical and chemical properties as manifested in extremely high molecular weights, tensile strength, form-stability, film-forming capability, narrow characteristics melting point range, unique solubility characteristics, and to processes for producing such homopolymers employing unique manipulative techniques and operable conditions of polymerization.

It is well known that alkyl vinyl ethers, and particularly methyl vinyl ether, may be polymerized by the use of acid reacting catalysts to produce generally liquid or semisolid polymer products. The methyl vinyl ether polymers produced in such processes as described in U.S. Patents 2,104,000, 2,104,001 and 2,104,002, are such products which are of relatively low molecular weight and exhibit water-solubility at room temperature. One of the unique characteristics of these homopolymers is their solubility in water at relatively low temperatures, i.e., below about room temperature, and their insolubility at elevated temperatures. Such products have been suggested and used as modifiers for various materials including numerous synthetic and natural resin products, to improve many different properties of such natural and synthetic resin materials such as adhesiveness, plasticity, vapor transmission rates, etc. These polymers, however, are obviously unsuited, particularly in the homopolymeric form, for many applications wherein form-stability is required, and thus cannot be used to produce such things as self-sustaining form-stable films and fibers.

The production of form-stable polymers from methyl vinyl ether was first described in U.S. Patents 2,616,879 and 2,653,923, wherein polymerizations are described employing as the catalyst system a boron fluoride-ether complex while operating at extremely low temperatures in the range of about −30° C. down to about but not below −70° C. These temperatures of polymerization are distinguishable from the temperatures previously employed which were of the order of above about −10° C. The products produced at these very low temperatures using the boron fluoride-etherate complex catalyst system are form-stable rubbery polymers of somewhat higher molecular weight than those produced by the earlier techniques. These polymers, similarly as the earlier ones, are soluble in water below about 35° C. and insoluble above this temperature. In contradistinction to the earlier products, these homopolymers are apparently partially crystalline, manifesting to some degree the presence of isotactic material.

More recent developments in this area have resulted in the provision of processes suitable for the production of relatively high molecular weight amorphous homopolymeric methyl vinyl ether as described in U.S. Patent 3,022,280, and on the other hand in the production of a relatively high molecular weight highly crystalline cold water insoluble homopolymer by the use of such processes as described in U.S. Patents 3,014,014, 3,025,281, 3,025,-282 and 3,025,283. The latter group of patents employ metal salt reaction products as the general class of catalytic materials including also those commonly referred to as Ziegler type catalysts. Further the polymers produced by the processes described in this latter group of patents are characterized by a heterogeneous mixture of crystalline and non-crystalline polymers of a wide molecular weight distribution.

It has now been discovered that extremely high molecular weight homopolymers of methyl vinyl ether may be prepared by a unique process which results in products which are not only form-stable and particularly adaptable to produce high tensile films, fibers and the like but which are further characterized by unusual solubility characteristics hereinafter to be described coupled with other unique properties. Finally, the products produced by the processes of the present invention show a narrow molecular weight distribution.

It is therefore an object of the present invention to produce new, useful and outstanding homopolymers of methyl vinyl ether.

It is another object of the present invention to provide new, useful and outstanding homopolymers of methyl vinyl ether which are form-stable.

It is still another object of the present invention to provide high molecular weight homopolymers of methyl vinyl ether which are characterized by outstanding and unusual physical properties.

It is still another further object of the present invention to provide new homopolymers of methyl vinyl ether which exhibit unusual solubility characteristics which are form-stable and which can be used to produce films, fibers and the like of exceptional tensile strength and elongation characteristics.

It is still another further object of the present invention to produce homopolymeric methyl vinyl ether which exhibits outstanding structural homogeneity.

Another object of the present invention lies in the provision of processes for the production of homopolymers of methyl vinyl ether having the properties and characterizations described above.

Other objects will appear hereinafter as the description proceeds.

The process of the present invention which results in the homopolymers of this invention involves the polymerization of monomeric methyl vinyl ether in extremely pure form and under carefully controlled conditions employing a unique catalyst system. While it has heretofore been known to use boron trifluoride dialkyl etherates as a catalyst in the polymerization of methyl vinyl ether as described above, it has now been discovered that boron trifluoride in combination with 1,4-dioxane gives rise, under the specific conditions hereinafter described, to the unusual homopolymers with which this invention is also concerned. By the employment of such a unique catalyst system, it has now been discovered that homopolymers of methyl vinyl ether may be produced of extremely high molecular weight, of outstanding form-stability and tensile strengths, with most unusual and unique solvent characteristics. The large and unusual differences in properties of the homopolymers produced in the present invention clearly and unequivocally point to such products as being completely distinct in kind from those heretofore produced by way of the processes of the prior art.

While the unique and novel catalyst system employed in the processes of the present invention is the basic and critical feature of the process of this invention, it is preferred that numerous other conditions be met in order to achieve the optimum in properties in the final homopolymer. Thus, it is preferred, therefore, to employ materials which are highly purified, devoid of interfering reacting materials, and particularly water, to employ inert atmospheric conditions surrounding the reaction, and to use an inert diluent as a carrier for the monomer. The diluent is highly preferable since the polymerization reaction is exothermic at some point of the reaction cycle. It has also been discovered that it is preferred to employ such a diluent at about a certain maximum concentration in order to achieve, again, the optimum properties in the homopolymer. Finally, and less critical, is the catalyst concentration, but here, too, it is preferred that certain limitations be observed in order to achieve the best results.

As pointed out above, the unique catalyst system employed in the processes of the present invention is a boron trifluoride-dioxane combination wherein the mole ratio of dioxane to boron trifluoride is at least 1:2, and preferably at least about 3 to 4 with the preferred upper limit being no more than about 100:1, and the most preferable range being 5:1 to 50:1. The upper limit is by no means critical. The only factor controlling the amount of dioxane is its solubility in the other reactants, namely, the methyl vinyl ether monomer and inert solvent. In general, it has been found that above about the 100:1 upper limit stated above the dioxane is insoluble and therefore this is suggested as the area of cut-off for this ingredient. The boron trifluoride-dioxane combination catalyst system may be employed in the form of a boron trifluoride-dioxane complex as such, or dissolved in an excess of dioxane, or conversely, one may employ a boron trifluoride-etherate complex, for example, a boron trifluoride-diethyl etherate, a boron trifluoride-dibutyl etherate, and the like dissolved in dioxane, which combination mainfests similar unusual catalytic effects as the boron trifluoride-dioxane complex itself. Where the catalyst is a boron trifluoride-dialkyetherate complex in dioxane, the lower limit is not only preferred to be at least about 3:1 (dioxane to dietherate on a molar basis), but in this specific catalyst embodiment it has been found that this lower limit is critical. The upper limits are, however, as indicated above, 100:1 (dioxane to dietherate on a molar basis) with 50:1 being preferred.

The general process of the present invention involves the employment of highly purified methyl vinyl ether into which the above described catalyst system is injected, all of the operations being carried out under substantially anhydrous and inert atmospheric conditions. The monomer is maintained at a temperature below about −40° C. and preferably below about −55° C. The preferred temperature for polymerization is that obtained with a Dry Ice-acetone bath combination which gives a temperature of −78° C. Temperatures as low as −100° C. may be employed to give the novel products of this invention. Maintaining the reactants at the selected temperature within the limits described above gives rise to the outstanding and unusual polymer product with which this invention is concerned. In general, it has been found that the optimum conditions for carrying out the polymerization yield a 90% or better conversion of the monomer to homogeneous, high molecular weight polymer product within about 10 to 24 hours. The higher conversions are obtained employing the more highly purified reactants and using catalysts at the upper end of the preferred range of catalyst concentration. This concentration relative to the amount of monomer present may vary from about 0.01 mole percent to about 1.5 mole percent, and preferably from about 0.05 mole percent to about 0.5 mole percent.

As pointed out above, it is one of the preferred conditions of the polymerization procedure to employ an inert non-reactive solvent as a carrier for the methyl vinyl ether monomer (so that the reaction system, i.e. solution, is a liquid at the beginning of the polymerization reaction) in order to attain the greatest degree of conversion and polymer of the best and optimum properties mainly because the presence of the solvent or diluent acts as a moderating influence during the polymerization and prevents undesirable reactions and heterogeneity of the product which could result due, among other factors, to the exothermic nature of the polymerization. The use of such inert solvents or diluent in the polymerization of vinyl ethers is well known but in the present reaction it is preferred to employ an aromatic hydrocarbon solvent, and particularly toluene, for such purposes. It is possible to use, in admixture with the aromatic hydrocarbon, aliphatic hydrocarbons such as heptane but it has been found that no more than 60 volume percent of such aliphatic hydrocarbons should be used. Still further, while halogenated hydrocarbons have been suggested as solvents in similar reactions, it is preferred not to employ same in the polymerization processes of this invention since the products obtained thereby do not have the optimum beneficial properties of the homopolymers with which this invention is concerned. The amount of solvent that should be employed should be no less than about 0.5 cc. per gram of monomer, and no more than about 25 cc. per gram of monomer. Within these limits, the preferred monomer solvent ratio on a gram per cc. basis should be 1:2 to 1:10.

It has been pointed out that the reactants should be in a high state of purity and thereby substantially anhydrous, and for such purposes, therefore, it is advisable and highly desirable that the methyl vinyl ether monomer be carefully treated to obtain it in such a highly purified state. Among the many techniques for purifying this monomer, the following are suggested:

(1) Reacting the monomer over sodium ribbons or a dispersion of sodium in a suitable reaction vessel from about room temperature to about 50° C.

(2) Water wash the monomer, treat it with potassium hydroxide pellets and then with sodium ribbon or a dispersion as in (1) above.

(3) Reflux the monomer over sodium ribbon or dispersion under a suitable fractionating column such as a 30 plate Oldershaw column and treat the best fractions with sodium ribbon or dispersion in an autoclave followed by a second treatment in an autoclave over sodium ribbon.

In place of sodium as a drying agent in the above purification procedures, it has also been found that calcium hydride gives excellent results.

The polymers resulting from the processes of the present invention are, again as pointed about above, characterized by an unusual homogeneity with respect to degree and nature of its structural order. The products which are obtainable may obviously vary in molecular weight as evidenced by measurements of viscosity from which inherent viscosity values can be obtained. The differences in molecular weight result from varying the conditions of the polymerization procedure such as catalyst concentration, solvent concentration and conditions of purity, etc. In general, the products which are produced by the practice of the processes of the present invention are characterized by inherent viscosity values of from about 1.1 to 6.0 and which translates to molecular weight values as high as about 3,000,000. The inherent viscosity is related to the molecular weight according to the Mark-Houwink equation (see Makromoleculare Chemie, vol. 37, pages 187–197, 1960):

$$[\eta] = 7.6 \times 10^{-4} M^{0.60}$$

wherein $[\eta]$ = intrinsic viscosity and $M$ = molecular weight for measurements in benzene. The inherent viscosity at 0.1% concentration is very close to the intrinsic viscosity and only slightly smaller. Thus $\eta = 2.303 \log{}^{\text{inh}} \eta_{\text{rel.}}/C$ wherein $C$ = grams of polymer per 100 cc. solution, $\eta_{\text{rel.}}$ = relative viscosity and $$[\eta] = \eta_{\text{inh.}} \atop \lim_{C \to 0}$$

At the lower end of the inherent viscosity range, i.e., 1.1 to 1.8, the tensile strength of the products rises rapidly with increasing viscosity to about 2100 lbs. p.s.i. This is in contradistinction to tensile strengths of the order of about 1000, or less, p.s.i. below an inherent viscosity value of 1.1. Above about a value of 2.5, the tensile strength rises only slightly and approaches a value of about 3000 p.s.i. at the upper end of the inherent viscosity range. The polymers of this invention are further characterized by birefringent melting points of the order of from about 60 to 70° C. This is confirmed by thermomechanical measurements made on a piece of film under a static initial stress of 20 p.s.i. suspended in a lagged tube, heated at a rate of about 1° C. per minute until the film breaks into two pieces. The birefringent melting point is determined by measuring the temperature of complete disappearance of birefringence of a hand-worked sample on a Kofler hot stage which is mounted on a microscope stage equipped with a polymerizer and an analyzer. The samples are worked in order to get birefringence. The validity of this procedure is established from X-ray diffraction measurements made on unstressed films which are obtained from a solution of the polymer, while films show similar levels of crystallinity before and after the stressing produced by the hand-working. The temperature of disappearance of crystallinity measured using a hot stage mounted on an X-ray diffractor is substantially the same as the temperature of complete disappearance of birefringence of the hand-worked sample, thereby confirming the validity of this procedure. The polymers produced in accordance with the present invention are soluble in benzene and methanol. They are insoluble in petroleum ether. By far the most unusual solubility characteristic of the polymers is its solubility in water at temperatures below about 10° C. and its insolubility above about this temperature. At a temperature of about 0° C., the polymers swell and completely dissolve in water. After solution has been effected at 0° C., the polymers remain soluble until a temperature of about 26–30° C. is reached, at which point they precipitate from the water solution. The combination of the properties in water coupled with high tensile strength and a specific melting point range is unique. Finally, the polymers under X-ray diffraction measurement show a significant amount of crystallinity as evidenced by the character of the diffraction rings indicating a considerable portion of the polymer is isotactic. The percent "crystallinity" based upon an empirical scale derived from X-ray diffractometer measurements on films indicates percent values of from about 10 to 20%.

The following examples will serve to illustrate the present invention without being deemed limitative thereof. Where parts are indicated, these are by weight unless otherwise stated.

EXAMPLE 1

In this and the following examples, procedures and techniques are described making use of a dry box containing a dry nitrogen atmosphere. Specific details of such techniques will be found more fully described below.

The polymerization procedure in this example is carried out in a carefully cleaned bottle equipped with a perforated crown cap and a self-sealing crown cap liner. The bottle which is used has first been alternately evacuated and filled with nitrogen on a vacuum manifold several times with intermittent warming with a hot air gun. The reactor (bottle) is capped in a dry nitrogen-filled dry box (or glove box). Hypodermic syringe assemblies and other necessary equipment used during the reaction manipulation are handled similarly. Into the aforementioned nitrogen-filled and capped bottle there is carefully introduced by way of a hypodermic needle, 31.0 g. of methyl vinyl ether which has been previously purified and dried over sodium ribbon. The technique for transferring the monomer to the reaction bottle involves vaporizing the monomer from the storage vessel thereof through a closed initially evacuated system and condensing the vapors at a lower temperature (0 to −10° C.) through the aforementioned hypodermic needle which has been previously injected into the reaction vessel. The latter is then placed into a Dry Ice-acetone bath at a temperature of −78° C. and into the reaction bottle there is injected by way of a hypodermic needle, 95 cc. of purified and dried toluene. The latter is purified and dried over sodium ribbon and is taken from bottles which are capped similarly as the reactor bottle in a dry box and then pressured with dry nitrogen immediately prior to withdrawal into the hypodermic syringe. Into the toluene monomer solution which has been temperature equilibriated at −78° C. there is injected again by means of a hypodermic syringe, 1.40 cc. of a catalyst solution which comprises 0.11 g. of boron trifluoride-diethyl etherate per cc. of solution thereof in 1,4-dioxane. The mole ratio of 1,4-dioxane to boron trifluoride-diethyl etherate is about 14:1. Both the diethyl etherate and the dioxane used to prepare the stock catalyst have been previously highly purified and the dioxane stored over a sodium ribbon. The catalyst bottle is also pressured with dry nitrogen and both it and the reactor bottle are equipped with a device which makes it possible to keep a flowing nitrogen atmosphere over the crown caps thereof whereby it is possible to inject or remove reagents with a hypodermic syringe in an essentially moisture- and air-free fashion. Immediately after the injection of the catalyst, the reaction bottle is given a quick shake and then permitted to remain overnight. The next day the contents are a clear, non-flowing gel at −78° C. Methanolic ammonia is injected to quench the reaction at this time, and enough toluene is added to make the solution traceable. (The total reaction is about 20 hrs.) The contents of the reaction bottle are then carefully transferred into suitable dishes and the solvent is pumped off. The resultant polymer is a clear, tough, strong, elastomeric, non-tacky film that, after some extension on pulling, shows reversible extensibility. The yield of polymer is 28.3 g., equivalent to 91.3% conversion. The inherent viscosity of 0.1% solution of the product in benzene at 25° C. using a Ubbelohde viscometer is 3.26. For comparison, the intrinsic viscosity is 3.33 and the viscosity number (reduced viscosity) is 9.07 for a 1% solution. In this example the amount of catalyst used is 0.21 mole percent relative to the amount of monomer present and the ratio of methyl vinyl ether in grams to toluene cc. is 1:3. A birefringent melting point measurement is made, taken on a Kofler hot stage mounted on a polarizing microscope. The melting point is the temperature of the disappearance of birefringence and is found to be 61–64° C. A thermomechanical measurement is made on a piece of film under a static initial stress of 20 p.s.i. heated at a rate of about 1° C. per minute. At a temperature of about 60° C. the film breaks into two pieces. This polymer is soluble in benzene and methanol but insoluble in petroleum ether. A sample is placed in water at room temperature but no solution results. The temperature is gradually lowered and at 0° C. the polymer swells rapidly and completely dissolves in the water. A 2% water solution of the polymer is noted to be unusually viscous. A water solution of the polymer is heated to about 40° C. and the resultant precipitate of polymer is then separated, dried and pressed into a film on a Carver press. This precipitation technique removes catalyst from the polymer. The catalyst-ammonia complex can also be removed by filtering the toluene solution. From water solution, the polymer is then separated, dried and pressed into a film on a Carver press. An X-ray diffraction pattern on an unstressed film shows a significant amount of crystallinity to be present as evidenced by the character of the diffraction rings. The tensile strength measurements on the film show a value of 1970 p.s.i. and an elongation of 6.31 in. (relative to 1 in. grip separation on the Instron machine). The stress-strain curve has no yield point. The polymer forms a tough rubber crepe when worked on a two-roll mill. The reaction time is about 20 hours.

EXAMPLE 2

Example 1 is repeated except that the methyl vinyl ether monomer which is used is a sample which had been highly purified as in Example 1 but then stored at a temperature of about −10° C. for about a month in the absence of any preserving agent. The reaction is run for 21 hrs. at −78° C. in a manner identical to Example 1. The reactor product is quenched with methanolic ammonia, diluted with toluene, the solution filtered and solvent pumped off. The yield of product which is a clear, colorless, tough elastomeric film and filament forming material, is 90%. The inherent viscosity measured similarly as in Example 1 is 1.84. The birefringent melting point is 65–67° C. Tensile strength is 2030 p.s.i. and elongation at break is 6.72 in. beginning with a 1 in. grip separation on the Instron machine. The 100% modulus is 300 p.s.i., the 200% modulus is 340 p.s.i., and the 300% modulus is 360 p.s.i. These values are an index of a material of rubbery character. There is no yield point on the tensile curve. A thermomechanical measurement carried out as in Example 1 gives a value of 62° C.

EXAMPLE 3

The procedure of Example 1 is repeated employing 21.4 g. of methyl vinyl ether monomer, 64 cc. of purified toluene, and 0.10 mole percent of the same boron trifluoride-diethyl etherate in dioxane catalyst combination (titer is 0.104 g. boron trifluoride-diethyl etherate in 1 cc. dioxane solution). The reaction is quenched and worked up as in Example 2 after 23 hrs. The yield is 19.4 g. of a tough, elastomeric film former that is clear and colorless. The birefringent melting point on a hand drawn film is 69–70° C. The inherent viscosity of an 0.1% benzene solution is 4.90, and the intrinsic viscosity is 5.15. The product exhibits an X-ray percent relative crystallinity scale value of 14.6%. Tensile strength measurements and elongation are made as in the previous examples, resulting in value of 2660 p.s.i. tensile strength, and percent elongation is 945%. The solubility characteristics of the polymer are similar to those of the products of the previous examples.

EXAMPLE 4

The procedure of Example 1 is once again repeated employing 27.7 g. of methyl vinyl ether and 81 cc. of purified toluene. The catalyst system is the 0.104 titer of Example 3 and is used in an amount of 0.15 mole percent based on the monomer employed. After 5 hrs. in the −78° C. bath, it is noted that the reaction solution is very viscous and after 24 hrs. the polymerization reaction is quenched and worked up as Example 2. The product which is obtained appears, physically, similar to those in the preceding examples in 90% yield and has a birefringent melting point of 63° C., an inherent viscosity of 4.94 in benzene at 0.1% concentration, an X-ray relative crystallinity scale value of 12.8%, tensile strength of 2530 p.s.i. and a percent elongation of 1028%. A density percent relative crystallinity scale based on 0% being equivalent to a density equal to 1.0378 and 100% being equivalent to a density equal to 1.1824 give a value of 12.5%. The 100% value is derived from calculations based on X-ray diffraction measurements and a density gradient column is used for the density measurements. The polymer film which is obtained is strong, tough and draws slightly in the hand. After drawing it is elastomeric, as evidenced by its reversibility extensibility. The product is non-tacky, too.

EXAMPLE 5

In the following examples carried out as a set and at the same time, the procedure of Example 1 is repeated with the reaction time being about 20 hrs., employing the same titer catalyst. The reactions are quenched and worked up as in Example 2. In these examples varying molecular amounts of catalyst based on monomer content are used. These are indicated below in Table I with the characteristics of the polymer also indicated.

TABLE I

| Ex. 5 | Gms. MVE/cc. Toluene | Mole percent $BF_3$-etherate in 1,4-dioxane | $\eta_{inh}$ (0.1% benzene) 25° C. | Yield percent | Tensile Strength, p.s.i. | Percent Elongation | X-ray percent Relative Crystallinity Scale | Bir. M.P., ° C. |
|---|---|---|---|---|---|---|---|---|
| A | 1/3 | 0.06 | 0.95 | 87.5 | 1,450 | 817 | 18.4 | 68 |
| B | 1/3 | 0.20 | 3.00 | 99 | 2,340 | 937 | 16.7 | 60.5 |
| C | 1/3 | 0.50 | 1.65 | 100 | 2,080 | 992 | 19.6 | 65 |
| D | 1/3 | 1.0 | 1.22 | 100 | 1,670 | 955 | 17.9 | 62 |

EXAMPLE 6

In the following Examples 6A through 6E carried out as a set and tabulated below in Table II, the procedure of Example 1 is again repeated using, however, boron trifluoride-diethyl etherate of 0.104 titer (i.e., 0.104 g.) thereof per 1 cc. of dioxane solution. The working is as in Example 2. The catalyst concentration is held constant at 0.20 mole percent based on the weight of the monomer but the solvent to monomer ratio is varied as indicated.

TABLE II

| Ex. 6 | Gms. MVE/cc. Toluene | Mole percent Catalyst | Yield, percent | Reaction Time, hrs. | $\eta_{inh}$ (0.1% benzene) 25° C. | X-ray percent Relative Crystallinity Scale | Tensile Strength | Percent Elongation |
|---|---|---|---|---|---|---|---|---|
| A | 1/20 | 0.20 | 7.6 | 22 | 0.173 | | | |
| B | 1/20 | 0.20 | 33.0 | 46 | 1.754 | 16.6 | 3,020 | 829 |
| C | 1/10 | 0.20 | 46.0 | 22 | 1.680 | 18.2 | 2,530 | 881 |
| D | 1/10 | 0.20 | 81.5 | 46 | 2.127 | 16.5 | 2,780 | 881 |
| E | 1/3 | 0.20 | 96.5 | 22 | 2.80 | 12.3 | 2,780 | 1,104 |

From the above table it will be noted that at a ratio (grams monomer to cc. toluene) of 1:3, there is an excellent yield of an outstanding product in 22 hrs. This is in line with the results of the previous examples. At a 1:10 ratio after 22 hrs., while the product is satisfactory, the yields are poor. However, after 46 hrs. product is improved and the yields markedly so. At 1:20 ratio after 22 hrs., there is very little product and this of little value. However, after 46 hrs., excellent product results although in relatively poor yields, and this because the condition of monomer to solvent ratio is approaching the upper maximum limit which is preferred in the present invention. As the solvent-to-monomer ratio gets larger and approaches and even passes the upper maximum preferred limit, the major deficiency in the process resides in poor yield and very long reaction times. However, it is to be noted that the product which is finely obtained is commensurate with that which results under the more desirable and preferable conditions of operation.

EXAMPLE 7

The procedure of Example 1 is repeated employing however, catalyst of 0.104 titer. Reaction time in each of the following Examples 7A through 7E carried out as a set, is 22 hrs. The results are tabulated in Table III below.

TABLE III

| Ex. 7 | Gms. MVE/cc. Toluene | Mole percent Catalyst | Yield, percent | $\eta_{inh}$ (0.1% benzene) 25° C. | X-ray percent Relative Crystallinity Scale | Tensile Strength, p.s.i. | Percent Elongation |
|---|---|---|---|---|---|---|---|
| A | 1/3 | 0.20 | 92 | 2.53 | 12.0 | 2,530 | 965 |
| B | 1/10 | 0.14 | 35.9 | 2.11 | 14.5 | 2,770 | 985 |
| C | 1/10 | 0.20 | 52.3 | 1.98 | 14.1 | 2,460 | 1,020 |
| D | 1/10 | 0.50 | 97.5 | 1.77 | 14.4 | 2,210 | 941 |
| E | 1/10 | 1.00 | 99.2 | 1.29 | 14.7 | ---- | 1,015 |

From the above, once again it is to be noted that at the higher solvent-to-monomer ratios the yields are poor at the lower catalyst concentrations but the products, nevertheless, quite satisfactory.

EXAMPLE 8

In the following Examples 8A through 8E which are carried out as a set, the procedure of Example 1 is followed. The main solvent is toluene with the monomer (grams) to toluene (cc.) ratio being 1:3. In Example 8A the catalyst is pure boron trifluoride-diethyl etherate (catalyst solution A). In Examples 8B through 8E, the catalyst employed is a boron trifluoride-diethyl etherate in dioxane having a titer of 0.102 g. of boron trifluoride-diethyl etherate per 1 cc. or dioxane (catalyst solution B). In Example 8B, this catalyst combination is used as such. In Examples 8C through 8E, extra dioxane is added to the methyl vinyl ether in toluene solutions at −78° C. to give dioxane concentrations of 43 moles, 70 moles, and over 100 moles of dioxane per mole of boron trifluoride-diethyl etherate. In Example 8B, this ratio is 15:1. The total reaction time in each of the examples is 20 hrs. The data is tabulated below in Table IV.

TABLE IV

| Ex. 8 | Estimated volume percent 1,4-dioxane in Total Solvent | Moles Dioxane/ Mole BF₃ Etherate | Mole percent Cat. | Over Catalyst Solution | Yield, percent | $\eta_{ink}$ (0.1% benzene) 25° C. | Tensile/ percent Elongation | X-ray percent Cryst. Scale | M.P. Bir./ Softening Point |
|---|---|---|---|---|---|---|---|---|---|
| A | 0 | 0 | 0.20 | (A) | 88.3 | 1.10 | Weak film | 7.2 | −/38-43° C. |
| B | 1.4 | 15/1 | 0.20 | (B) | 98 | 1.95 | 2,210/1,200% | 12.4 | 62-63° C./57° C. |
| C | 3.0 | 43/1 | 0.20 | (B) | 94.8 | 2.27 | 2,550/1,191% | 12.0 | Not measured. |
| D | 6.0 | 70/1 | 0.20 | (B) | 90.5 | 2.04 | 2,420/1,169% | 13.6 | Do. |
| E | 16.4 | Over 100/1 | 0.20 | (B) | 83.5 | 1.98 | 2,450/1,220% | 12.5 | Do. |

From the above data it is clear that while boron trifluoride diethyl etherate alone gives a fairly good yield of polymer, it is completely different in its properties from the products of the present invention as previously described, and as illustrated in the examples which follow. Examples B through E illustrate the outstanding properties of the products of the present invention which result from the processes thereof.

EXAMPLE 9

The Example 1 procedure is again repeated as a set at −78° C. using a catalyst concentration relative to monomer as indicated below. The catalyst (a) has a titer of 0.104 g. boron trifluoride-diethyl etherate per 1 cc. of dioxane in Examples 9A and (b) 0.063 g. boron trifluoride-diethyl etherate per 1 cc. of toluene in Examples 9B, 9C and 9D. The monomer to toluene ratio is 1 g./3 cc. in each example and reaction times are 23 hours. The results are tabulated below in Table V.

TABLE V

| Ex. 9 | Catalyst Solution | Mole percent Cat. Relative to Monomer | Yield, Percent | $\eta_{ink}$ (0.1% benzene) 25° C. | Tensile/percent Elongation | 100% Modulus/ 200% Modulus | X-ray Percent Cryst. Scale | Bir. M.P., ° C. |
|---|---|---|---|---|---|---|---|---|
| A | (a) | 0.1 | 95.2 | 3.32 | 2,630 p.s.i./1,105% | 460 p.s.i./520 p.s.i. | 12.6 | 65 |
| B | (b) | 0.2 | 95.4 | 1.20 | 550 p.s.i./720% | 240 p.s.i./300 p.s.i. | 8.4 | 55 |
| C | (b) | 0.1 | 82.3 | 1.40 | 1,040 p.s.i./1,039% | 260 p.s.i./330 p.s.i. | 9.4 | 58 |
| D | (b) | 0.01 | 4.5 | 0.55 | (¹) | (¹) | (¹) | (¹) |

¹ Not measured.

The above data demonstrates that in the absence of dioxane the polymer product has deficient viscosity and tensile properties and at equivalent catalyst concentrations the yields are poor.

EXAMPLE 10

The Example 1 procedure is repeated as a set using varying catalyst concentrations as set forth in Table VI. In Example 10a, 10b and 10c the catalyst is boron trifluoride-diethyl etherate in toluene (titer 0.104 g./cc. solution) and in Examples 10d, 10e and 10f, the catalyst is boron trifluoride-diethyl etherate in dioxane (titer 0.105 g./cc. solution). Monomer/toluene ratio is 1 g./3 cc.; temperature is −78° C. and reaction time is 19½ hours.

TABLE VI

| Ex. 10 | Catalyst Carrier | Mole Percent Catalyst | Yield, Percent | $\eta_{ink}$ (0.1% benzene) 25° C. | Tensile Strength | Percent Elongation | X-ray Percent Relative Crystallinity Scale | Viscosity Appearance at 2 Hours |
|---|---|---|---|---|---|---|---|---|
| a | Toluene | 0.20 | 83.4 | 1.37 | (¹) | (¹) | 7.7 | Non-flowing gel. |
| b | do | 0.10 | 84.0 | 1.65 | 1,469 | 1,303 | 7.6 | Do. |
| c | do | 0.05 | 83.2 | 1.89 | 1,360 | 1,121 | 8.8 | Do. |
| d | 1,4-dioxane | 0.20 | 100 | 2.89 | 2,280 | 1,099 | 12.3 | No viscosity. |
| e | do | 0.10 | 100 | 3.47 | 2,870 | 1,125 | 11.6 | Do. |
| f | do | 0.05 | 97.5 | 4.90 | (¹) | (¹) | (¹) | Do. |

¹ Not measured.

EXAMPLE 11

This experiment demonstrates the polymer which is formed using catalyst system of the prior art.

The technique and procedure of Example 1 are repeated except that the catalyst is a solution of boron trifluoride-diethyl etherate in diethyl ether (titer is 0.053 g. boron trifluoride-diethyl etherate per gram of catalyst solution). Temperature of polymerization is −78° C. and reaction time is 19½ hours.

TABLE VII

| Ex. 11 | Mole Percent BF$_3$-etherate in Diethyl Ether | $\eta_{ink}$ (0.1% benzene) 25° C. | Yield, Strength, | Tensile Elongation p.s.i. | Percent Elongation | X-ray Percent Relative Crystallinity Scale |
|---|---|---|---|---|---|---|
| A | 0.02 | 0.82 | 23 | 760 | 533 | 12.4 |
| B | 0.15 | 0.89 | 91 | 600 | 453 | 14.0 |

EXAMPLE 12

The Example 1 procedure is repeated using as the catalyst 2·boron trifluoride-dioxane complex dissolved in dioxane (titer 0.099 g. complex/g. of solution). Monomer/toluene ratio is 1 g./3 cc.; reaction time is 21½ hours; temperature is −78° C. Catalyst concentration is varied as indicated below:

TABLE VIII

| Ex. 12 | Mole Percent Catalyst | $\eta_{ink}$ (0.1% benzene) 25° C. | Yield, Percent | Tensile Strength | Percent Elongation | X-ray Percent Relative Crystallinity Scale |
|---|---|---|---|---|---|---|
| A | 0.28 | 2.51 | 100 | 1,720 | 1,371 | 9.7 |
| B | 0.14 | 3.48 | 97.5 | 2,390 | 1,244 | 10.7 |

EXAMPLE 13

The reaction technique of Example 1 and the product isolation technique of Example 2 are repeated except that the temperatures used are as indicated below:

(a) −30° C.
(b) −46° C.
(c) −50° C.
(d) −55° C.
(e) −60° C.
(f) −70° C.
(g) −100° C.

The product from 13(a) is amorphous with no significant strength. At −40° to −50° C. the products are similar to that of Example 1 but with lower tensile properties. The products of 13(d) through (g) are excellent.

EXAMPLE 14

Example 1 is again repeated using catalyst concentrations of:

(a) 0.01 mole percent
(b) 0.03 mole percent
(c) 0.05 mole percent
(d) 0.08 mole percent
(e) 1.5 mole percent The products are excellent but in 14(a) and 14(b), the yields are somewhat less than 85%.

EXAMPLE 15

Example 1 is once again repeated except that in place of 95 cc. of toluene, the following amounts are used:

(A) 15.5 cc.
(B) 31.0 cc.
(C) 62.0 cc.
(D) 775.0 cc.

The products of 15A through 15D are excellent; the yield in 15D is quite low, however.

EXAMPLE 16

Example 15D is repeated using twice the catalyst concentration. The yield is, then, comparable to Example 1.

EXAMPLE 17

This example is carried out at −78° C. in the same manner as Example 1 except that the catalyst system used is a slurry of solid 2 BF$_3$·dioxane in toluene. The latter is 0.0966 g. catalyst per 1 cc. total solution. The reaction solvent is toluene and the grams methyl vinyl ether per cc. toluene is ⅓. An aliquot of catalyst slurry equivalent to 0.1 mole percent 2 BF$_3$·dioxane related to monomer is injected into the −78° C. reaction solution. The catalyst slurry does not appear to be soluble in the reaction solution. Reaction time at −78° C. is 21½ hours. The workup is carried out as in Example 2 and gives a 91% yield. The $\mu_{inh}$ (0.1% solution in benzene) at 25° is 2.37; X-ray percent related crystallinity scale is 10.7%; tensile strength is 2.300 p.s.i. and per cent elongation is 1299%.

Other variations in and modifications of the described processes which will be obvious to those skilled in the art can be made in this invention without departing from the scope or spirit thereof.

I claim:

1. A process for preparing a homopolymer of methyl vinyl ether, said homopolymer being characterized by the following properties
   (1) insoluble in water down to about 10° C.
   (2) precipitates from water solution at about 26° C. to 30° C.
   (3) a birefringent melting point of from about 60° C. to 70° C.

said process comprising polymerizing methyl vinyl ether by contacting, at a temperature in the range of from about −100° C. to about −55° C., a substantially anhydrous liquid solution of methyl vinyl ether in a non-reactive aromatic hydrocarbon solvent consisting essentially of toluene, with from about 0.01 mol percent to about 2.0 mol percent based on said methyl vinyl ether, of a catalyst of 1,4-dioxane with a member of the class consisting of boron trifluoride and boron trifluoride-dialkyl-etherate, the ratio of 1,4-dioxane to boron trifluoride being 1:2 to 100:1 and the ratio of 1,4-dioxane to boron trifluoride-dialkyletherate being from 3:1 to 100:1.

2. The homopolymer of methyl vinyl ether produced by the process of claim 1.

References Cited

UNITED STATES PATENTS 2,799,669  7/1957  Zoss _____ 260—91.1
3,080,352  3/1963  Fishbein et al. _____ 260—91.1

OTHER REFERENCES

Acetylene Chemistry, PB Report 188152–5, (1949), pp. 45–54.

JOSEPH L. SCHOFER, *Primary Examiner.*

H. WONG, JR., *Assistant Examiner.*